United States Patent [19]
Papuchon et al.

[11] 4,236,785
[45] Dec. 2, 1980

[54] NON LINEAR THIN LAYER OPTICAL DEVICE

[75] Inventors: Michel Papuchon; Brigitte Puech; Michel Werner, all of Paris, France

[73] Assignee: Thomson-CSF, Paris, France

[21] Appl. No.: 886,594

[22] Filed: Mar. 14, 1978

[30] Foreign Application Priority Data

Mar. 23, 1977 [FR] France .................. 77 08628

[51] Int. Cl.³ .................................................. G02B 5/14
[52] U.S. Cl. .............................. 350/96.14; 350/96.13
[58] Field of Search ....................... 350/96.11–96.14

[56] References Cited

U.S. PATENT DOCUMENTS

| | | | |
|---|---|---|---|
| 3,877,782 | 4/1975 | Kaminow | 350/96.14 |
| 3,935,472 | 1/1976 | Bethea | 350/96.12 |
| 3,985,423 | 10/1976 | Tseng | 350/96.13 |
| 3,990,776 | 11/1976 | Tseng et al. | 350/96.13 |
| 4,032,216 | 6/1977 | Henry | 350/96.13 |

OTHER PUBLICATIONS

P. K. Tien et al. "Switching and Modulation of Light in Magneto-Optic ... " Appl. Phys. Lett., vol. 21, No. 8, Oct. 15, 1972, pp. 394–396.

*Primary Examiner*—Stewart J. Levy
*Attorney, Agent, or Firm*—Cushman, Darby & Cushman

[57] ABSTRACT

The invention relates to non-linear optical devices in which significant non-linear interactions are obtained by establishing a "quasi phase matching". The optical device according to the invention comprises on the surface of a substrate a periodic structure formed of zones in which the non-linear coefficient alternately assumes two values of opposite signal. The invention also relates to a process for producing this device. The invention allows generation of harmonics, frequency changing, parametric amplification or parametric oscillation.

7 Claims, 5 Drawing Figures

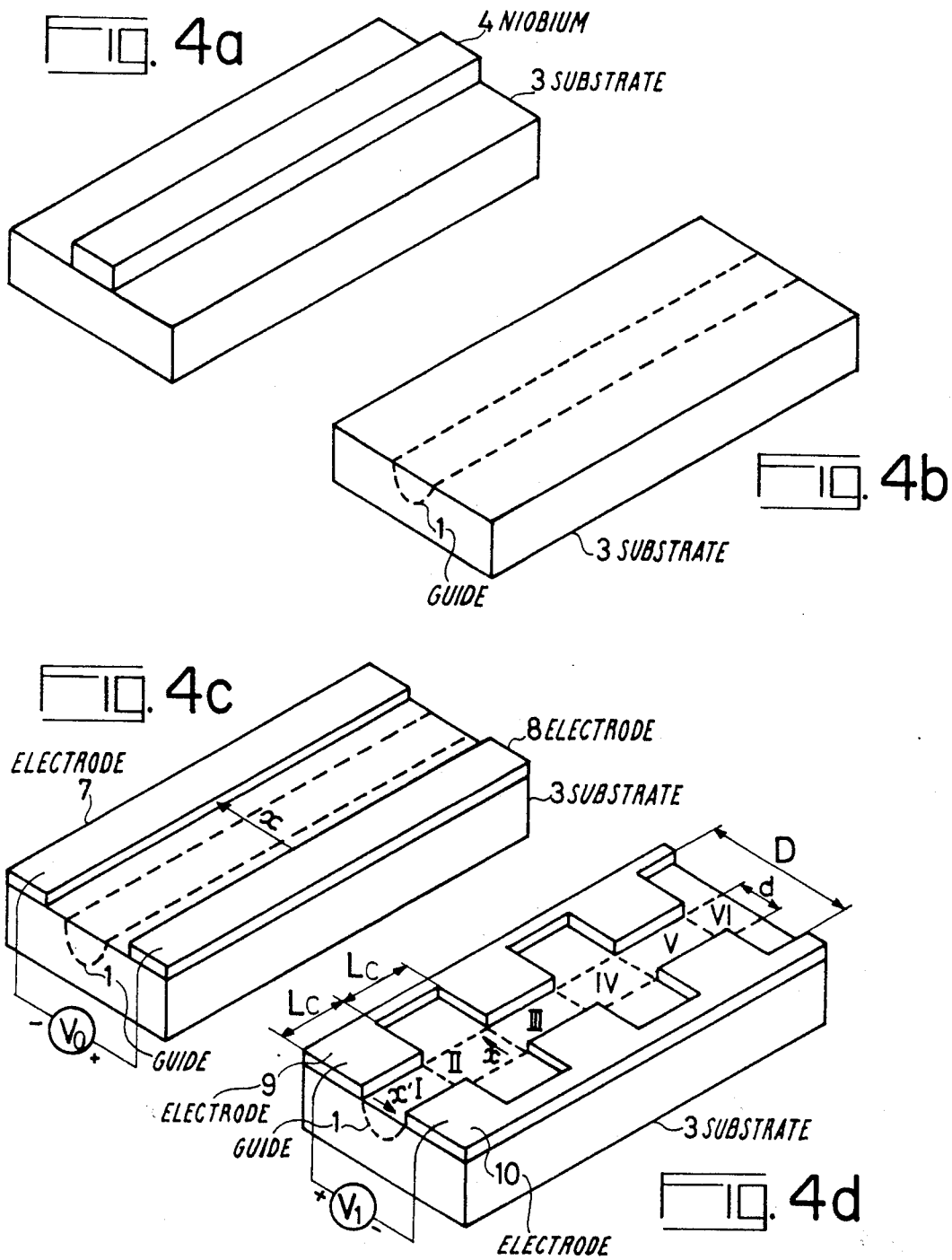

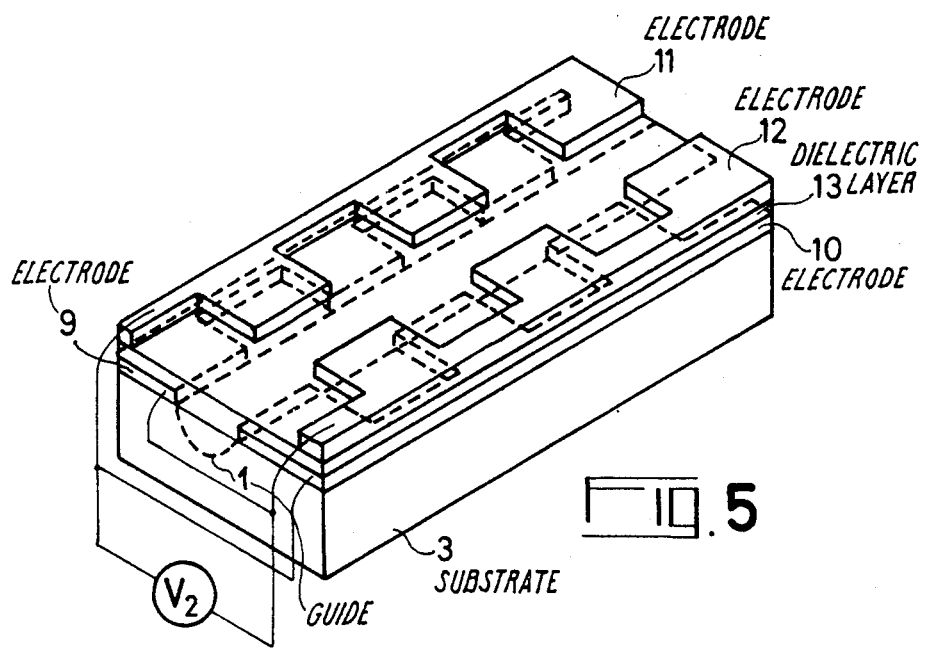

NON LINEAR THIN LAYER OPTICAL DEVICE

This invention relates to non-linear thin-layer optical devices with which it is possible to obtain significant non-linear interactions, enabling a wave of different frequency to be generated from one or more incident waves.

In order to obtain the best transfer of energy from the incident waves to the generated wave, the non-linear polarisation and the wave which is propagated freely at the interaction frequency must be in phase throughout the device. It is known that phase matching can be established in crystals having non-linear properties in guided or unguided optics. To this end, the propagation constant of the free wave must be equal to the sum of the propagation constants of the interacting waves. This result is obtained for example by acting on the polarisation directions of the waves, on the dimensions of the guide in guided optics or on the orientation of the crystals relative to the direction of propagation, thus utilising the anisotropy of these crystals.

In numerous cases, it is impossible to fulfill the condition of phase matching. In cases where phase matching is possible, it is critically dependent upon the experimental conditions. It is for this reason that, in many cases, it is considered sufficient to establish a state of quasi phase matching by periodically reducing the accumulated phase difference by creating a network of suitable pitch consisting of zones for which the non-linear coefficient in the propagation direction alternately assumes two values of opposite sign. Although the results in regard to the effectiveness of conversion, i.e. in regard to the intensity of the generated wave relative to the excitation wave, are not as good as in the case of phase matching, they can nevertheless be interesting provided that the non-linear coefficient is high and that the number of zones is large. In the case of a bulk device, the network is formed by a stack of differently cut crystals, but unfortunately the requirements as to the precision of the elements in regard to their dimensions and alignment limit the choice of the materials and also the number of elements of the network.

The present invention relates to a thin layer optical transmission device having a network-like structure and to a process for its production. The masking techniques commonly used in this field eliminate the problem of alignment and provide for high precision. In addition, the invention affords a possibility of electrical adjustment for adjusting the quasi-phase matching in accordance with the radiation using. Among other effects, the optical device allows generation of harmonics, frequency changing, parametric amplification and parametric oscillation.

In accordance with the present invention, there is provided a non-linear optical device for generating a non-linear interaction between optical radiations propagated along a direction z in an homogeneous thin layer of ferro-electric material, said device comprising a thin layer made of ferro-electric domains and a first pair of electrodes deposited on said layer; said electrodes being arranged opposite one another and having a periodic shape delimiting a succession of odd and even zones of length L on said layer in said direction z, L being equal to an odd multiple of the coherence length of said interaction; the ferro-electric domains of the successive zones having been alternately polarised in opposite directions, so that the non-linear coefficient of said material alternately has opposite signs in the successive zones.

For a better understanding of the present invention, and to show how the same may be carried into effect, reference will be made to the ensuing description and the accompanying drawings among which:

FIG. 4 shows the various steps of the process by which this device is produced.

FIG. 5 shows an electrical adjusting means.

In the following description; we shall consider an optical guided-transmission device. However, the invention is also applicable to the case of non-guided propagation on the surface of a substrate. The description is concerned more especially with a device for generating harmonics from an incident luminous wave, although this does not exclude other potential applications utilising non-linear effects. It will first of all be assumed that the guide is monomode with respect to the incident radiation and the generated harmonic wave.

Figure 1:
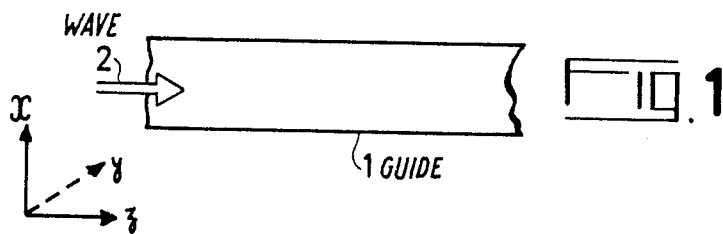
FIG. 1 shows an optical wave guide.

FIG. 1 shows an optical wave guide 1 propagating a luminous wave 2 of wavelength $\lambda$. The electrical field in the guide is expressed as follows: $\bar{E}_w = A(x,y)[EXP\ i(wt - \beta_w z)]\hat{e}$. $A(x,y)$ represents the distribution of the amplitude of the field in the directions x and y perpendicular to the propagation direction z; $\beta_w$ is the guided propagation constant; w is the pulsation of the wave: $w = 2\pi c/\lambda$, c being the speed of light; $\hat{e}$ is the unit polarisation vector of the wave. The electrical field corresponding to a free wave travelling at the pulsation 2 w is expressed as follows:

$\bar{E}_{2w} = B(x,y) EXP\ i(2wt - \beta_{2w}z)\hat{s}$. $B(x,y)$ represents the distribution of the amplitude of the field; $\beta_{2w}$ is the guided propagation constant of the free harmonic wave; $\hat{s}$ is the unit polarisation vector. The electrical field $\bar{E}_w$ induces a polarisation of which the development to the second order may be expressed as follows:

$\bar{p} = \chi^{(1)}\bar{E}_w + \chi^{(2)}\bar{E}_w\bar{E}_w$; $\chi^{(1)}$ is the linear susceptibility tensor and $\chi^{(2)}$ is the non-linear susceptibility tensor. The second order term $\bar{P}_{NL} = \chi^{(2)}\bar{E}_w\bar{E}_w$ translates the non-linear response of the medium to the applied field. In the interests of simplification, it will be assumed that the second order tensor $\chi^{(2)}$ may be reduced to a single coefficient $\chi_{NL}$ for a given direction of $\bar{E}_w$, so that:

$$P_{NL} = \chi_{NL} A^2(x,y) EXP\ i(2wt - 2\beta_w z).$$

The interaction between the polarisation $P_{NL}$ and the free wave $E_{2w}$ produces the generation of an harmonic wave. This interaction depends essentially upon the phase shift between the two waves: $(2\beta_w - \beta_{2w})z$. The calculations developed in the journal THOMSON-CSF, Vol. 6, No. 4 of December 1974, lead to the expression of the intensity I of the generated harmonic wave:

$$I = K I_o^2 \left[ \frac{\sin \frac{2\beta_w - \beta_{2w}}{2}}{\frac{2\beta_w - \beta_{2w}}{2}} \right]^2$$

where K is a constant which depends upon w, upon the effective indices of the guide for the fundamental wave:

n(w) and the harmonic wave: n(2w) and upon the coefficient $\chi_{NL}$; $I_o$ is the intensity of the excitation wave; n(w) and n(2w) are respectively associated with $\beta_w$ and $\beta_{2w}$ by the relations:

$$\beta_w = n(w)w/c \text{ and } \beta_{2w} = 2n(2w)w/c.$$

Figure 2:
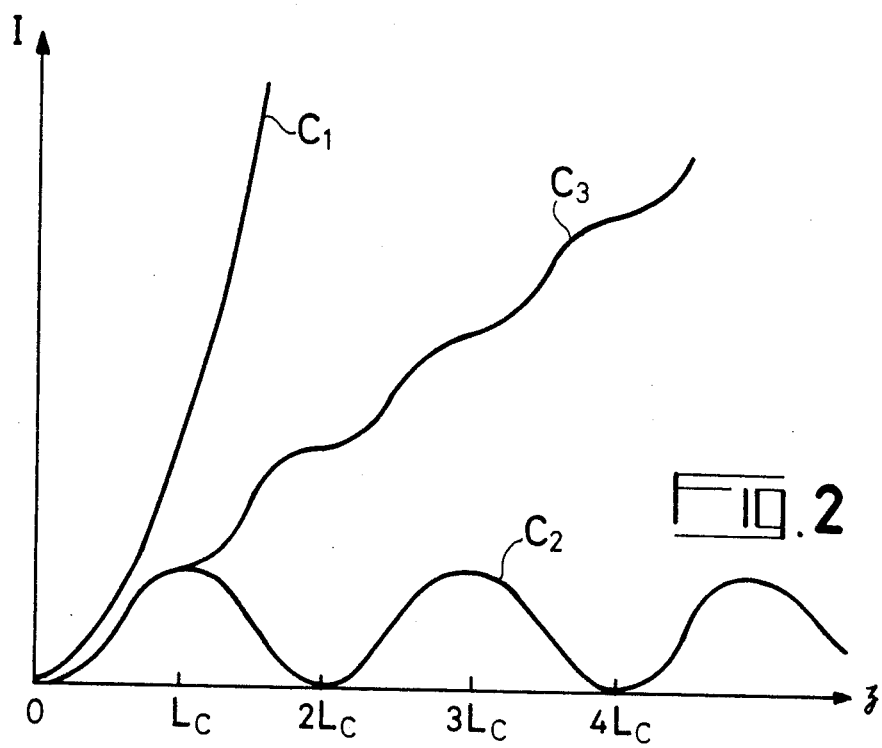
FIG. 2 is a diagram of the variation in the harmonic power generated with respect to the length of interaction.

The variations of I with respect to the interaction length z are represented in the diagram of FIG. 2. When phase matching is established, i.e. $2\beta_w = \beta_{2w}$, i.e. n(w)=n(2w), the curve $C_1$ is obtained. The harmonic waves generated by the various points of the guide are always in phase and their respective energies are added together. When n(w)≠n(2w), the curve $C_2$ is obtained. The intensity of the harmonic wave periodically passes through a maximum: for $z=L_c$, $z=3L_c$, ... where $L_c$ is the length of coherence: $L_c=\pi/(2\beta_w-\beta_{2w})$. Between two maxima, the intensity disappears because of an inverse transfer of energy. Since the required objective is the generation of harmonics with maximum effectiveness, if phase matching is impossible or difficult to obtain, it is possible to obtain a quasi-phase matching whereby it is possible, where $z>L_c$, to avoid energy being transferred to the fundamental wave. Where $z=L_c$ (or $z=3L_c$...) the polarisation $P_{NL}$ is in phase opposition relative to the wave $E_{2w}$. By inverting the sign of the coefficient $\chi_{NL}$, it is possible to produce a phase shift of $\pi$ and thus to reestablish the conditions under which energy is transferred to the harmonic wave. By periodically effecting this inversion of sign by a network of which the pitch is equal to $L_c$, the curve $C_3$ is obtained. Since the value of I increases with the interaction length z, the desired values may be obtained with a sufficiently long guide.

Figure 3:
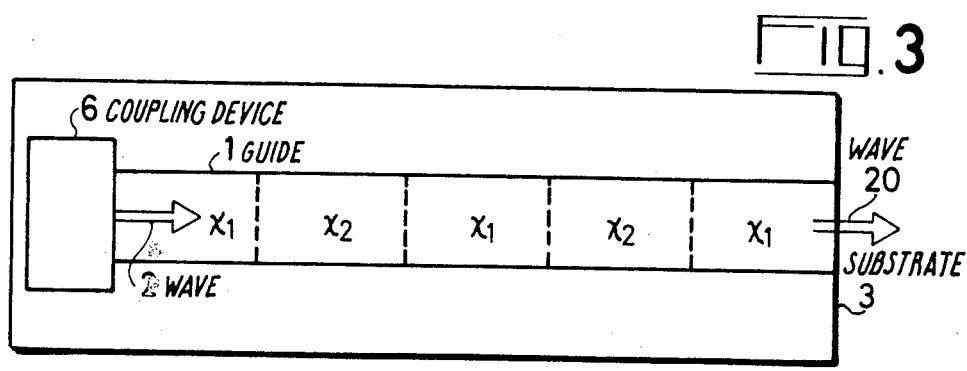
FIG. 3 shows an optical device according to the invention.

FIG. 3 shows the structure of an optical device according to the invention. The guide 1 situated on the surface of a substrate 3 is formed by a succession of zones of length $L_c$ or an odd multiple of $L_c$, aligned in the direction of propagation of the light. In these zones, the non-linear coefficient $\chi_{NL}$ alternately assumes two opposite values $\chi_1$ and $\chi_2$. The incident radiation 2 is introduced into the guide by a coupling device 6. A wave 20 having two components of wavelength $\lambda$ and $\lambda/2$, the latter being the harmonic component, is collected at the output end.

The successive steps of a process for producing the device of FIG. 3 are shown in FIG. 4. The described embodiment leads to the sign inversion: $\chi_1=\chi$, $\chi_2=-\chi$, but may readily be extended to the general case where $\chi_{NL}$ assumes two separate values of opposite sign. According to the invention, the sign inversion of $\chi_{NL}$ is obtained by using a ferro-electric material and inverting the polarisation of the ferro-electric domains. The first step shown at (a) and (b) concerns the production of the wave guide. FIG. 4(a) shows a substrate 3 made of a ferro-electric material which we shall assume to be lithium tantalate which is particularly advantageous because its non-linear coefficient along the axis z: $\chi_{33}$ is very high (about $20.10^{-12}$ m/V). The guide is obtained by localised metallic diffusion, for example of niobium Nb. A strip 4 of niobium corresponding to the location of the desired guide is formed by masking. The replacement of tantalum atoms by niobium atoms creates in the unmasked part a zone having an index higher than the index of the substrate. Diffusion is carried out at about 1000° C., i.e. above the Curie temperature which is about 700° C. The guide 1 shown at (b) is obtained after diffusion.

The second step shown at (c) consists in polarising the crystal, and more particularly the guide zone, so that all the ferro-electric domains are polarised in the same direction. This direction corresponds to the axis c of the crystal. An electrical voltage $V_o$ is applied between electrodes 7 and 8 attached to the substrate 3, creating a transverse electrical field. This step is carried out at a temperature slightly below the Curie temperature. The voltage $V_o$ must be sufficient for all the ferro-electric domains to be polarised in the same direction symbolised by the arrow x. The non-linear coefficients in the guide and, in particular, the coefficient $\chi_{33}$ relative to an incident wave polarised parallel to the axis c of the crystal are constant.

The third step is shown at (d). It involves the production of the network of FIG. 3. After having removed the electrodes 7 and 8, a set of electrodes 9 and 10 in the form of crenels, of which the spacing is equal to the length of coherence of the guide, is deposited on the substrate 3. The value of the length of coherence may be obtained either empirically or by calculation. It is approximately 5 $\mu$m for the selected example. The distance between the electrodes is alternately equal to d, which may be selected equal to the width of the guide, and D which is considerably greater. A voltage $V_1$ opposite in polarity to $V_o$ is applied between the electrodes 9 and 10 so that the electrical field $V_1/d$ is sufficient to invert the direction of polarisation of the domains, the field $V_1/D$ being too weak to effect the inversion. After suppression of the voltage $V_1$, there are obtained zones of length $L_c$: I, II, III, ..., in which the domains are alternately oriented in the direction x (II, IV, VI) and in the direction x' opposite to x (I, III, V), so that the coefficient $\chi_{NL}$ is alternately positive and negative, whilst retaining the same value $\chi_{33}$. The electrodes are formed by masking processes similar to those used for the production of semi-conductors. The precision is about 0.1 $\mu$m over a length of as much as 5 cm. The number of zones may thus be very considerable. Because of the difficulty to know the exact value of the coherence length, it may be preferable to form several sets of electrodes differing in their spacing and to determine which set produces the best quasi phase matching by measuring the harmonic power generated. In this case, too, the inversion of polarisation takes place at a temperature slightly below the Curie temperature. The temperature may be reduced providing the voltage $V_1$ is increased. The exact value of the voltage $V_1$ is experimentally determined because, by means of optical processes using polarised light, it is possible to observe the inversion of the domain polarisations.

In spite of the high degree of precision obtained by the electronic maskers, if the number of zones is very large (if $L_c=5$ $\mu$m, the number of zones may reach 10,000), the final error is in danger of being troublesome. In addition, the value of the coherence length may depend upon experimental conditions, particularly temperature, and may also depend upon the wavelength because of its relation with the effective indices n (w) and n(2w). It is therefore of advantage to be able to effect, for each use of the device, a fine adjustment of the coherence length without modifying the electrodes.

FIG. 5 shows one example of the adjusting means. Use is made of the fact that ferroelectric materials have electro-optical properties. By applying a suitable electrical field to each zone, it is possible to modify the indices n (w) and n (2w) differently and hence to act on the coherence length. Since the polarisations of two adjacent zones are inverted, electrical fields of opposite values have to be applied to two adjacent zones in order to obtain a uniform modification of the indices throughout the guide. A new set of electrodes 11 and 12 having a shape complementary to that of the electrodes 9 and 10 is used for the zones II, IV, VI. The electrodes 11 and 12 are isolated from the preceding electrodes by a layer 13 of dielectric material, for example silica. The electrodes 9 and 12 are electrically connected as are the electrodes 10 and 11. The electrodes 11 and 12 are connected to a source of variable d.c. voltage $V_2$. An electrical field $V_2/d$ is thus obtained in the zones I, III, V, whilst an electrical field $-V_2/d$ is obtained in the zones II, IV, VI, the fields $V_2/D$ and $-V_2/D$ being very weak. By measuring the intensity of the harmonic wave, $V_2$ is acted on to obtain the maximum intensity. By virtue of this possibility of electrical adjustment, it is possible to obtain a harmonic power of greater than 10 mW for a guide 5 cm long and an incident power of 100 mW. The wavelength range for the incident light may extend from 0.6 $\mu$m to several $\mu$m.

It has been assumed thus far that the guide is monomode with respect to the incident wave and the generated wave. Although it is possible to use a multimode guide, the interaction is far less strong in that case because the coherence length depends upon the mode and the quasi-phase matching can only be obtained for one mode for the incident wave and one mode for the generated wave. It is therefore preferable for the dimensions of the guide to allow the propagation of a single mode in the wavelength ranges in question.

The device produced by the process described above has various applications. In addition to the generation of harmonics, it may be used in the production of a parametric amplifier. The guide is excited by two waves, a pumping wave of pulsation $w_p$ and a signal wave of pulsation $w_s$. If the pitch of the network is equal to $\pi/\beta(w_s)+\beta(w_p)-\beta(w_s)$, the pulsation of the generated wave is $w_s$ so that the signal wave is amplified to the exclusion of any wave having a pulsation different from $w_s$. Similarly, a parametric oscillator may be produced by placing a network-like guide with a pitch corresponding to a pulsation $w_s$ between two mirrors highly reflective to a radiation of pulsation $w_s$. Of all the waves spontaneously transmitted in the cavity thus formed, only the waves of pulsation $w_s$ are amplified and an oscillator with a wavelength electrically controllable by the voltage $V_2$ is obtained.

What we claim is:

1. A non-linear optical device for generating a non-linear interaction between optical radiations propagated along a direction z in an homogeneous thin layer of ferro-electric material, said device comprising a thin layer made of ferro-electric domains and a first pair of electrodes deposited on said layer; said electrodes being arranged opposite one another and having a periodic shape delimiting a succession of odd and even zones of length L on said layer in said direction z, L being equal to an odd multiple of the coherence length of said interaction; the ferro-electric domains of the successive zones having been alternately polarised in opposite directions; so that the non-linear coefficient of said material alternately has opposite signs in the successive zones.

2. A device as claimed in claim 1, wherein the two electrodes of said first pair are symetrical in respect with the axis of said device in said direction z, the shape of said electrodes being that of crenels, the distances between said two electrodes being alternately d for said odd zones and D for said even zones, so that the application of an electrical voltage between said two electrodes creates a sufficient electrical field to orientate the polarisation of the domains of said odd zones and has no effect on the polarisation of the domains of said even zones.

3. A device as claimed in claim 1, wherein said thin layer is a waveguide deposited on the surface of a substrate.

4. A device as claimed in claim 3, wherein said waveguide is monomode with respect to said propagated optical radiations.

5. A device as claimed in claim 3, wherein said substrate is made of lithium tantalate and said waveguide is obtained by diffusion of niobium on the surface of said substrate.

6. A non-linear optical device for generating a non-linear interaction between optical radiations propagated along a direction z in an homogeneous thin layer of ferro-electric material, said device comprising a thin layer made of ferro-electric domains and a first pair of electrodes deposited on said layer; said electrodes being arranged opposite one another and having a periodic shape delimiting a succession of odd and even zones of length L on said layer in said direction z, L being equal to an odd multiple of the coherence length of said interaction; the ferro-electric domains of the successive zones having been alternately polarised in opposite directions, so that the non-linear coefficient of said material alternately has opposite signs in the successive zones; said device further comprising means for regulating said coherence length, said means comprising an isolating layer deposited on said first pair of electrodes, a second pair of electrodes deposited on said isolating layer and a source of variable voltage $V_2$ connected to said first and second pairs of electrodes, said voltage $V_2$ producing variations in the refractive index of said material.

7. A device as claimed in claim 6, wherein the two electrodes of said first pair are symetrical in respect with the axis of said device in said direction z, the shape of said electrodes being that of crenels, the distances between said two electrodes being alternately d for said odd zones and D for said even zones, so that the application of an electrical voltage between said two electrodes creates a sufficient electrical field to orientate the polarisation of the domains of said odd zones and has no effect on the polarisation of the domains of said even zones; said second pair of electrodes having a crenellated shape complementary to that of said first pair of electrodes.

* * * * *